(12) United States Patent
Norman

(10) Patent No.: US 8,896,601 B1
(45) Date of Patent: Nov. 25, 2014

(54) PROJECTING GEOGRAPHIC DATA FROM A SPHERICAL SURFACE TO TWO-DIMENSIONAL CARTESIAN SPACE

(75) Inventor: Phil Norman, Basel (CH)

(73) Assignee: Google Inc., Mountain View, CA (US)

( * ) Notice: Subject to any disclaimer, the term of this patent is extended or adjusted under 35 U.S.C. 154(b) by 939 days.

(21) Appl. No.: 13/027,905

(22) Filed: Feb. 15, 2011

Related U.S. Application Data

(60) Provisional application No. 61/392,367, filed on Oct. 12, 2010.

(51) Int. Cl.
*G06T 15/00* (2011.01)
*G06T 15/10* (2011.01)
*G09G 5/00* (2006.01)
*G06F 17/30* (2006.01)
*G06T 17/00* (2006.01)

(52) U.S. Cl.
CPC .......... *G06F 17/30241* (2013.01); *G06T 17/00* (2013.01)
USPC ........... 345/427; 345/419; 345/582; 345/648; 345/584; 345/586; 345/649; 345/585; 345/672

(58) Field of Classification Search
CPC ......... G06T 17/00; G06T 15/04; G06T 17/05; G06F 17/30241
USPC ......... 345/419, 427, 582, 648, 584, 586, 649, 345/585, 672
See application file for complete search history.

(56) References Cited

U.S. PATENT DOCUMENTS

| 7,576,754 B1 | 8/2009 | Joseph et al. |
| 2006/0251336 A1* | 11/2006 | Lelescu et al. ................. 382/276 |
| 2009/0123088 A1 | 5/2009 | Kallay et al. |
| 2010/0001997 A1* | 1/2010 | Kajikawa et al. ............. 345/419 |

* cited by examiner

*Primary Examiner* — Jeffrey Chow
(74) *Attorney, Agent, or Firm* — Marshall, Gerstein & Borun LLP

(57) ABSTRACT

A method for projecting geographic data (e.g., latitude and longitude coordinates) from a spherical surface onto a two-dimensional Cartesian space is provided. Such a capability can employ a coordinate testing and transformation method to map the projected geographic data within the two-dimensional Cartesian space so that distances measured on the spherical surface remain relatively consistent with distances measured in the two-dimensional Cartesian space. Further, this capability allows for the use of efficient search algorithms to find projected geographic points within a particular geographic search area.

27 Claims, 9 Drawing Sheets

US 8,896,601 B1

PROJECTING GEOGRAPHIC DATA FROM A SPHERICAL SURFACE TO TWO-DIMENSIONAL CARTESIAN SPACE

CROSS REFERENCE TO RELATED APPLICATIONS

The present application claims the benefit of U.S. Provisional Patent Application No. 61/392,367, filed on Oct. 12, 2010, entitled "Projecting Geographic Data from a Spherical Surface to Two-Dimensional Cartesian Space" by Phil Norman, which is incorporated herein by reference in its entirety.

BACKGROUND

1. Field

Embodiments relate generally to the field of computer graphics.

2. Background

Systems exist for presenting three-dimensional data within a three-dimensional environment. The three-dimensional environment can include a virtual camera that defines what three-dimensional data to display. The virtual camera has a perspective according to its position and orientation. By changing the perspective of the virtual camera, a user can navigate through the three-dimensional environment.

A geographic information system is one type of system that uses a virtual camera to present a three-dimensional environment. A geographic information system is a system for storing, retrieving, manipulating, and displaying a substantially spherical three-dimensional model of, for example, the Earth. The three dimensional model may include satellite images texture mapped to terrain, such as mountains, valleys, and canyons. Further, the three-dimensional model may include both two-dimensional and three-dimensional features that are visible at different zoom levels.

In order to place features at a particular zoom level on a three-dimensional representation of the Earth, geographic information systems need to be able to detect if placing a particular feature will cause an intersection with an already-placed feature. This requires an area search over the surface of a sphere. Traditional solutions for doing this are complex and generally require a significant amount of memory.

BRIEF SUMMARY

A capability for projecting geographic data (e.g., latitude and longitude coordinates) from a spherical surface onto a two-dimensional Cartesian space is provided. Such a capability can employ a coordinate testing and transformation method to map the projected geographic data within the two-dimensional Cartesian space so that distances measured on the spherical surface are consistent with distances measured in the two-dimensional Cartesian space. Further, this capability allows for the use of efficient search algorithms to find projected geographic points within a particular geographic search area.

Embodiments relate to projecting geographic data from a spherical surface to a two-dimensional Cartesian space. In an embodiment, geographic data is projected from the spherical surface onto faces of a three-dimensional polyhedron. An example of such a three-dimensional polyhedron is a cube. The faces of the polyhedron are then arranged within the two-dimensional Cartesian space according to a cutout pattern that corresponds to the shape of the polyhedron. Additionally, geographic data points associated with the spherical surface are mapped to a first set of Cartesian coordinates associated with the arranged faces within two-dimensional Cartesian space. One or more (i.e., a subset of) the geographic data points are mapped to a second set of Cartesian coordinates within the two-dimensional Cartesian space based on the cutout pattern so that relative distances among the geographic data points remain consistent between the spherical surface and the two-dimensional Cartesian space.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 1:
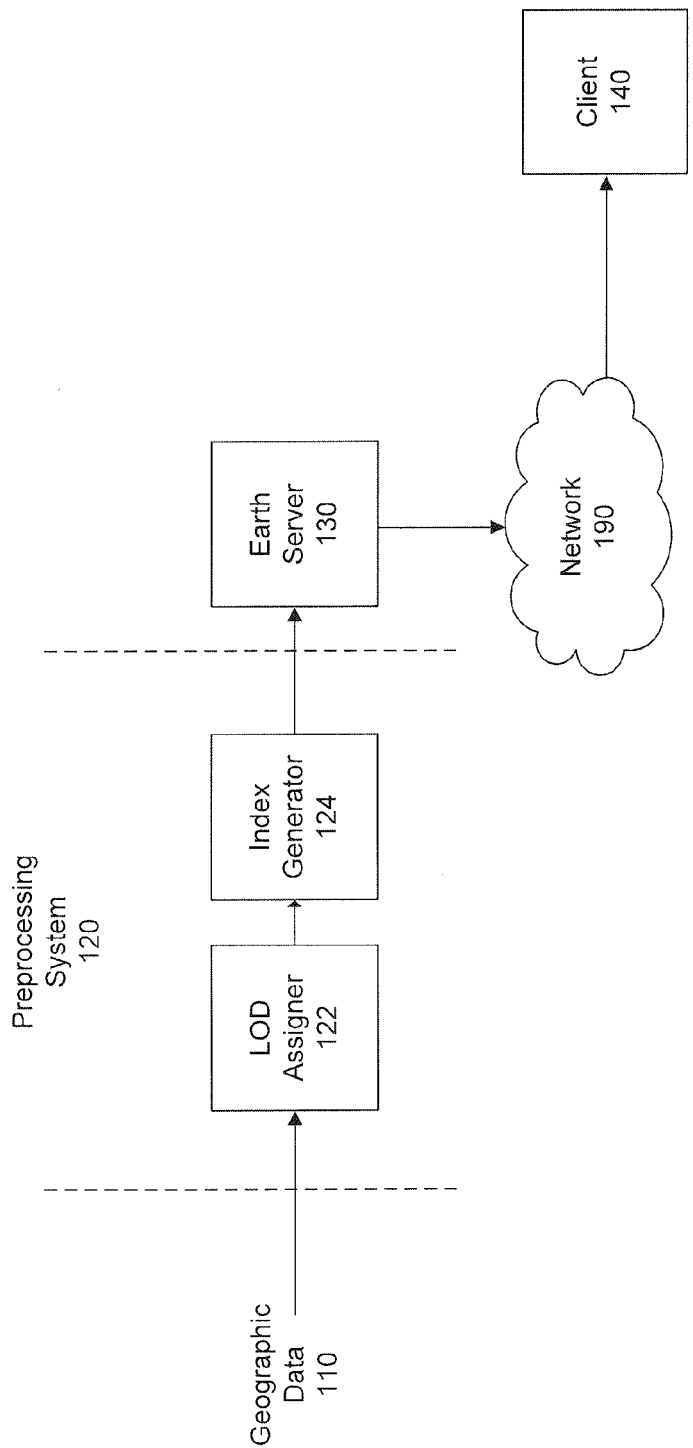
FIG. 1 is a diagram of a system suitable for indexing data, according to an embodiment.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

I. Introduction

Embodiments relate to projecting geographic data, for example, latitude and longitude coordinates, from a spherical surface to a two-dimensional Cartesian space. Embodiments may employ a coordinate testing and transformation method to map the projected geographic data within the two-dimensional Cartesian space so that distances measured on the spherical surface remain relatively consistent with distances measured in the two-dimensional Cartesian space. It is noted that the terms "consistent" and "relatively consistent" are used interchangeably herein to refer to distances that are not significantly different (e.g., greater than a factor of two) between geographic data points and the corresponding points as projected within the Cartesian coordinate space. It is also noted that the term "consistent" as used herein to refer to distances should not be interpreted to mean a fixed ratio. Further, embodiments may allow for the use of efficient search algorithms to find projected geographic points within a particular geographic search area. Consequently, the use of efficient search algorithms may enable the placement of features at a particular level of detail within a three-dimensional representation of a substantially spherical surface of, for example, a celestial body including, but not limited to, the Earth.

For example, embodiments may be implemented within geographic information systems for purposes of detecting whether placing a particular feature corresponding to one or more objects on the spherical surface would cause an intersection with an already-placed feature. For example, various features or objects associated with the spherical surface may be thinned out depending on a particular zoom level in a layered three-dimensional space. For example, such a space may comprise several three-dimensional layers with objects or features that can be overlayed on top of the spherical surface. As will be described in further detail below, the features or objects to display at a particular zoom level may be based on a score.

An example of such a layered three-dimensional space may be found in Google Earth from Google Inc. of Mountain View, Calif. Thus, for example, objects comprising descriptive information of a particular geographic area may be overlayed on top of the Earth. Such descriptive information can include, but is not limited to, text, graphic icons, thumbnails of photographs, or any other information. To do this, however, features must be thinned out so as not to display too much information at outer zoom levels, but progressively add more features as a user zooms in. An advantage of embodiments is that they allow for faster data generation in comparison to traditional methods. For example, Mercator-projection thinning, which works by first translating all points into a two-dimensional Cartesian coordinate space and performing searches with quad trees, is extremely fast. However, Mercator projection cannot be used for spherical thinning (e.g., for client applications such as Google Earth) as it produces large variations in the physical size of the area represented by a single pixel in the Mercator space. In addition, using Mercator projection for a spherical surface of a celestial body causes significant distortion between projected and actual distances near the poles (i.e., the ratio of projected to actual distance tends to infinity near the poles).

Accordingly, embodiments provide a relatively simple and fast translation from latitude/longitude coordinates from a spherical surface to a two-dimensional Cartesian space, while maintaining a small variation in the physical size of a pixel. Further, embodiments enable searching spherical geographic data using a projected and translated version of geographic data points within a two-dimensional Cartesian space. Thus, embodiments can reduce search complexity and increase computing performance relative to traditional solutions that generally require an area search over the three-dimensional spherical surface.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. System Overview

This section describes a system in which embodiments may be implemented. FIG. 1 is an exemplary architecture diagram of a system 100. In the example shown in FIG. 1, system 100 includes a preprocessing system 120. Preprocessing system 120 further includes a level of detail (LOD) assigner 122 and an index generator 124. Preprocessing system 120 may be coupled to an earth server 130, according to an embodiment. Preprocessing system 120 may communicate with network 190 through earth server 130. In a further embodiment, preprocessing system 120 can also be coupled directly to network 190 through connections not shown for clarity.

In an embodiment, preprocessing system 120 (and its components including level of detail (LOD) assigner 122 and index generator 124) can include pipelined processing or other processing arrangements to carry out its tasks as would be apparent to a person skilled in the art given this description.

Preprocessing system 120 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system.

Hardware can include, but is not limited to, a processor, memory and graphical user interface display. Preprocessing system 120 can also be implemented on a plurality of computing devices such as a cluster of computing devices located at the same or different locations.

Network 190 may be any type of network or combination of networks that can carry data communication. Such network 190 can include, but is not limited to, a local area network, medium area network and/or wide area network such as the Internet. Network 190 may be in a form of a wired network or a wireless network. Network 190 can support protocols and technology including, but not limited to, World Wide Web protocols and/or services. Intermediate web servers, gateways, or other servers may be provided between components of system 100 depending upon a particular application or environment. In an embodiment, earth server 130 may communicate over network 190 to a client 140. Client 140 will be described in further detail below with respect to FIG. 2.

LOD Assigner 122 receives geographic data 110. Geographic data 110 may include, but is not limited to, latitude/longitude coordinates corresponding to geographic data points from the spherical surface of celestial body such as, for example, the Earth. Such geographic data points may be associated with one or more features corresponding to various geographic objects of interest on the spherical surface. In an embodiment, LOD assigner 122 assigns a zoom level to each feature. As noted above, the zoom level assigned to each feature by LOD assigner 122 enables preprocessing system 120 to determine which features should be placed at a particular zoom level so as to prevent intersections or collisions with other features that may be placed at different zoom levels. As will be described in further detail below with respect to FIG. 3, LOD Assigner 122 may employ a projection technique to project geographic data 110 to a two-dimensional Cartesian space in order to improve computing efficiency and performance.

Once the features have been assigned appropriate zoom levels, index generator 124 may generate a distribution of the one or more features to various levels of a geo-spatial quad tree. For example, index generator 124 may store a feature having a particular zoom level at a node of the geo-spatial quad tree. Accordingly, the placement of a feature at a particular zoom level as applied to a geographic data point of interest on the spherical surface would correspond to the level of the quad tree node at which the feature is stored. Thus, index generator 124 generates a representation of geographic data 110, as processed by LOD assigner 122, that can be quickly served by earth server 130 to client 140 over network 190. Additional characteristics regarding the use and operation of a geo-spatial quad tree data structure within system 100 would be apparent to a person skilled in the relevant art given this description.

Earth server 130 may transmit geographic data to be displayed by client 140 over network 190. For example, earth server 130 may receive request from client 140 to transmit data corresponding to geographic region of interest on the spherical surface. Further, the request may include a bounded geographic search area in the form of a bounding box having latitude/longitude data points associated with the geographic region of interest on the spherical surface. In response to receiving the request, earth server 130 may transmit both images (e.g., in the form of image tiles) in addition to descriptive features corresponding to the latitude/longitude data points within the bounding box over network 190. In an embodiment, earth server 130 determines the relevant features associated with the geographic (i.e., latitude/longitude) data points that should be displayed and generates a compressed file in a Keyhole Markup Language (KML), which may be referred to as a "KMZ" file. Earth server 130 may determine such points using the data representation generated by index generator 124, described above. The generated KMZ file can then be transmitted by earth server 130 in a response to client 140 over network 190. Additional details of KML and KMZ files would be apparent to a person skilled in the relevant art given this description.

In an embodiment, earth server 130 may include a web server or may be coupled to communicate with a web server at the same or a different location. Such a web server can be a software component that responds to a hypertext transfer protocol (HTTP) request with an HTTP response. The web server may be, for example and without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language (XML), documents, videos, images, multimedia features, or any combination thereof. It is noted that the aforementioned examples of web servers are provided for illustrative purposes only and are not intended to limit embodiments.

Figure 2:
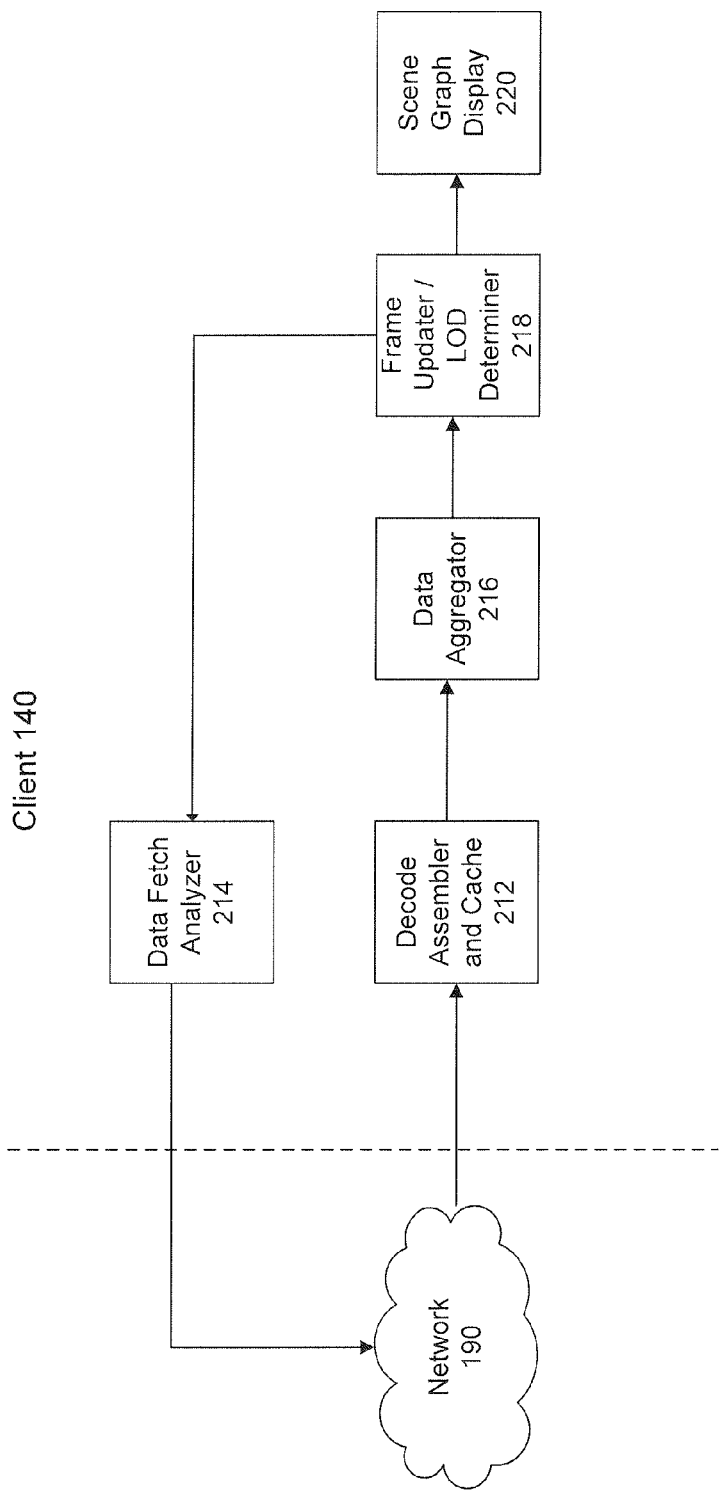
FIG. 2 is a diagram of a system suitable for parsing indexed data, according to an embodiment.

FIG. 2 illustrates an architecture diagram of a system 200 suitable for decompressing geometry and rendering geographic data in response to user commands, according to an embodiment. System 200 includes client 140 of FIG. 1, described above. Client 140 includes a decode assembler and cache 212, a data fetch analyzer 214, a data aggregator 216, a frame updater/LOD determiner 218, and a scene graph display 220. In an embodiment, preprocessing system 130 transmits data over network 190. Such data transmitted by preprocessing system 130 over network 190 may be received by client 140, according to an embodiment.

In an embodiment, client 140 processes a texture forest generated by preprocessing system 130 and transmitted in part by earth server 130 over network 190. Client 140 may choose which texture resolution to use when rendering a part of an object of interest and use the same single set of texture coordinates for all possible resolutions of that texture in the texture tree. Pre-vertex texture coordinates need not be computed at each resolution level while traversing the texture tree.

In an embodiment, the nodes of texture trees may be associated with the nodes of a spatial structure, such as, for example, a quad tree. Since it may be impractical to transmit the whole texture forest over a network to a client, such as from network 190 to client 140, the client can use the geo-spatial quad tree to decide what parts of the forest to fetch. In other words, the client may only download the parts of the forest that may be needed to render the scene currently in view.

Client 140 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Client 140 may also be implemented across multiple computing devices.

In an embodiment, decode assembler and cache 212 receives data from network 190. As an example, this data may comprise three dimensional data relating to geometries of various objects of interest in a scene. Furthermore, data may comprise image data in highly compressed formats, such as, for example, the JPEG 2000 format. As an example, decode assembler and cache 212 may convert the data from a received format to another format that may be less efficiently compressed, but more suitable for direct rendering by client 140. Additionally decode assembler and cache 212 may assemble and store the decoded data into data sets that may be used by client 140 for further processing.

Data fetch analyzer 214 processes each node of the geospatial quad tree that intersects the current view to be rendered by client 140 and whose resolution is not too detailed for the current view. Data fetch analyzer 214 downloads metadata for these quad tree nodes from earth server 130. The quad tree node metadata may indicate that the quad tree nodes contain geometric objects or textures, which are then downloaded.

Data aggregator 216 may receive a plurality of data sets that includes texture and geometry data relating to objects of interest and other objects in a scene. Data aggregator 216 may then aggregate the data sets before they are provided to frame updater/LOD determiner 218. As an example, data aggregator 216 may further aggregate textures and geometric objects using the same texture trees described above. Aggregation of various data sets may improve efficiency of client 140.

Similarly to textures having multiple resolution levels organized in a tree, geometric objects may have multiple, progressively more complicated representations organized in LOD trees. For example, coarse representations of objects may be generated preprocessing system 130 by proxy LOD generator 102. Frame updater/LOD determiner 218 processes a plurality of geometry LOD trees and texture trees received from data aggregator 216. In an embodiment, frame updater/LOD determiner 218 may determine LODs for all geometry and texture objects and update LODs that have been determined.

In an embodiment, a scene graph may be considered a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g. viewpoints, lights, backgrounds), and behaviors (procedures for modifying information stored in a scene graph).

As an example, not intended to limit the invention, a scene graph is implemented using object-oriented computer programming techniques. Thus, scene graph objects can be provided as object-oriented software objects, which may describe shape objects. For example, a scene graph can include a software object associated with an building image, and a scene graph display command can operate on the building object to render the building image on a graphical display.

Objects of a scene graph, for example, may be generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation. The scene graph can also be associated with a sequence of display commands, which can be used to generate the underlying data structure of the scene graph.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to an API.

In an embodiment, a scene graph generated and updated by frame updater/LOD determiner 218 may be provided to scene graph display 220. Scene graph display 220 renders a scene graph for display so that a scene may be viewed by a user of client 140.

As an example, scene graph display 220 may be associated with a 3D graphics circuit board having local processing capability, and the ability to interpret scene graph data and rapidly provide a corresponding graphical display on a monitor.

Exemplary scene graph programming techniques, in conjunction with the 3D graphic circuit board, provide the ability to rapidly render a 3D image on a graphical display. Images on the graphical display can also be rapidly updated with one or more display commands, provided by the application software, interpreted by the API, and sent to the 3D graphics circuit board.

III. Projecting Three-Dimensional Data to Two-Dimensional Cartesian Space

Figure 3:
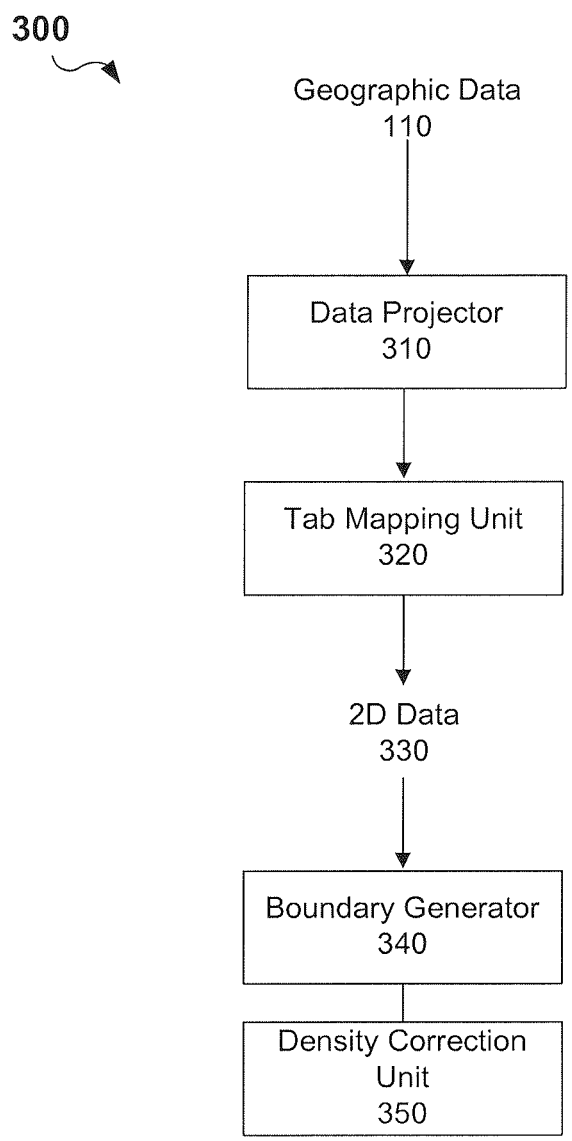
FIG. 3 is a diagram of an exemplary system for projecting geographic data from a spherical surface to a two-dimensional Cartesian space, according to an embodiment.

FIG. 3 is a diagram of an exemplary system 300 for projecting geographic data from a spherical surface to a two-dimensional Cartesian space, according to an embodiment. System 300 includes a data projector 310, a tab mapping unit 320, two-dimensional (2D) data 330, a boundary generator 340, and a density correction unit 350. System 300 may be implemented as a component of system 100 of FIG. 1, discussed above, according to an embodiment. For example, data projector 310, tab mapping unit 320, boundary generator 340, and density correction unit 350 may be implemented in one or more components of preprocessing system 120 (including LOD assigner 122 and index generator 124) of FIG. 1, as described above. Although only data projector 310, tab mapping unit 320, 2D data 330, boundary generator 340, and density correction unit 350 are shown in FIG. 3, it would be apparent to a person skilled in the relevant art given this description that system 300 may include additional components, modules, and/or sub-components as necessary. In an embodiment, data projector 310, tab mapping unit 320, boundary generator 340, and density correction unit 350 may be communicatively coupled via, for example, an internal data bus of device 100.

In an embodiment, a quad tree data structure using two distinct node types may be employed. A quad tree structure is generally a tree data structure in which each internal node has up to four children. A quad tree structure may be used, for example, to repeatedly subdivide space into quadrants. The structure has two distinct node types: leaf nodes and grid (or non-leaf) nodes. The leaf nodes are located at the bottom level (max_level) of the structure, and contain data entries (i.e., geo-located or geographic data) to be found in a bounding box associated with that node. Grid nodes may lie, for example, at levels 0 to max_level−1, and may contain the total number of data entries in all leaf nodes descendant of the node. However, an unbalanced tree may be used instead, in which a leaf node is only turned into a grid node and subdivided when the leaf node's population exceeds some predetermined threshold limit. This allows large geographic areas that have no features on the spherical surface (e.g., large areas of ocean on the Earth), or any large quantity of the Cartesian space that may not map to any part of the spherical space, to be represented using very little memory.

A spherical surface of a celestial body such as, for example and without limitation, the Earth can be represented using three-dimensional latitude/longitude space. At the top level in the index (i.e., level 0), a single grid node (root node) may cover the entire space (i.e., (−180, −90) to (180, 90)), using the longitude/latitude coordinate system. At each level from the top level, this space may be divided into various cells of data. A row/column coordinate system in that division at a particular level may be used. For example, across the entire grid, a unique coordinate system may be represented as the following ordered set: (row, column, level). The root node is thus at coordinates (0, 0, 0).

In an embodiment, geographic data 110 represents the geographic data (e.g., latitude/longitude coordinates) associated with the spherical surface. In an embodiment, data projector 310 is configured to project geographic data 110 from the spherical surface onto faces of a three-dimensional polyhedron. In an embodiment, geographic data 110 includes geographic data associated with the spherical surface. As noted above, the spherical surface may include, but is not limited to, the Earth, Mars, the Moon, or any other celestial body that may be modeled using a three-dimensional spherical surface. The three-dimensional polyhedron may include any geometric solid represented in a virtual three-dimensional space. In an example, described in further detail below, such polyhedron may be a virtual three-dimensional cube. It is noted that embodiments may be described with respect to a three-dimensional cube for illustrative purposes only, and embodiments are not limited thereto.

In an embodiment, data projector 310 further projects, or arranges, the faces of the three-dimensional polyhedron within a two-dimensional Cartesian space according to a cutout pattern corresponding to the type of three-dimensional polyhedron (see, e.g., the cube cutout pattern shown in FIG. 5A, described below). For example, the faces of the three-dimensional polyhedron may be arranged within the two-dimensional Cartesian space so that the faces are centered within the Cartesian space and have folding symmetry across each dimension of the two-dimensional Cartesian space. It is noted that embodiments do not require the cutout pattern be centered and that faces of the polyhedron be arranged to have folding symmetry within the two-dimensional Cartesian space. However, a person skilled in the relevant art given this description would appreciate that any additional processing costs that may be necessary to implement such an optimized arrangement of faces would be significantly outweighed by the processing gains associated with employing such an arrangement, as will be described in further detail below.

In an embodiment, data projector 310 also projects geographic data points associated with the spherical surface to the two-dimensional Cartesian space by mapping such points to Cartesian coordinates. The Cartesian coordinates to which the geographic data points are mapped correspond to the arranged faces of the virtual three-dimensional polyhedron within the two-dimensional Cartesian space.

It should be noted that the geographic data may be projected directly by data projector 310 from the spherical surface onto a cutout shape corresponding to the multiple faces of the polyhedron, according to an embodiment. Accordingly, the multiple faces of the cutout shape form the virtual polyhedron if they were to be folded in three-dimensional space. Further, the cutout shape may be, for example, centered on the two-dimensional Cartesian space in order to provide folding symmetry across each dimension of the two-dimensional Cartesian space, as described above.

In an embodiment, tab mapping unit 320 further maps one or more, or a subset, of the projected geographic data points to a second set of Cartesian coordinates within the two-dimensional Cartesian space. In a further embodiment, tab mapping unit 320 maps the one or more projected geographic data points by transforming sections of the arranged faces to various locations within the two-dimensional Cartesian space. Thus, the second set of Cartesian coordinates correspond to the various locations to which the subset of projected geographic data points are mapped. Such sections may be referred to herein as "tabs." In an example, each section or tab may be of a predetermined size and all sections/tabs may be of the same size. Thus, for example, a section may be a quarter of each face of the three-dimensional polyhedron, where all the faces of the polyhedron are of the same size. This is illustrated by tabs 502 and 504 in the example two-dimensional Cartesian space shown in FIG. 5B, described further below.

Notably, these tabs are mapped across the two-dimensional Cartesian space in such a way as to ensure that edges of the faces of the polyhedron that adjoin in three-dimensional space also adjoin within the two-dimensional Cartesian space. Accordingly, relative distances among the projected geographic data points remain consistent between the spherical surface and the two-dimensional Cartesian space. For example, each of two geographic data points, which are relatively near each other on the spherical surface, may be projected onto different faces of the polyhedron. The different faces may then be projected or arranged by data projector 310 within the two-dimensional Cartesian space in such a way that the projected geographic data points are no longer near each other. In this regard, a search for all points near the first point would not produce the second point leading to inaccurate search results. In order to avoid such search discrepancies, any one projected geographic data point may be associated with either one or two sets of Cartesian coordinates within the two-dimensional Cartesian space.

In an embodiment, tab mapping unit 320 transforms tabs within the two-dimensional Cartesian space by applying various transformations to each of the tabs. For example, tab mapping unit 320 may apply one type of transformation to one tab associated with a face and a second transformation to another tab associated with a different face. Further, the first transformation may be based on a first face-dependent rotation associated with the first face and the second transformation may be based on a second face-dependent rotation associated with the second face.

In an embodiment, such transformations may involve rotating and transposing the tabs to various locations within the two-dimensional Cartesian space, as described above. For example, tab mapping unit 320 may first determine a quadrant of the two-dimensional Cartesian space for each data point corresponding to different tabs or sections, which may in turn be associated with different faces. Tab mapping unit 320 may then rotate and transpose the sections within the determined quadrant based on respective face-dependent rotations. Tab mapping unit 320 may determine the face-dependent rotations based on the projected geographic data associated with each face within the two-dimensional Cartesian space. For example, the geographic data may correspond to a specific geographic region from the spherical surface (e.g., a continent or body of land from the Earth's surface). A person skilled in the art would appreciate how such a face-dependent rotation may be determined based on the geographic region projected on a particular face.

To simplify the transformations, tab mapping unit 320 uses face-dependent rotations based on an angle of rotation specific to the shape of the three-dimensional polyhedron. In an example, for a three-dimensional cube, tab mapping unit 320 uses face-dependent rotations that are multiples of 90 degrees. In a different example using a dodecahedron comprising 12 regular pentagonal faces, tab mapping unit 320 uses face-dependent rotations that are multiples of 72 degrees. Further, it is noted that different tabs may be rotated in different directions. For example, a first face-dependent rotation may be 90 degrees in a first direction (e.g., clockwise) and a second face-dependent rotation may be 90 degrees in a second direction opposite to the first direction (e.g., counter-clockwise).

In an embodiment, tab mapping unit 320 produces 2D data 330 once the projected geographic data points have been mapped to two-dimensional Cartesian coordinates, as described above. Thus, 2D data 330 represents a two-dimensional version of geographic data 110. As noted above, one advantage of a mapping from three-dimensional space to two-dimensional space is a significant performance advantage related to searching for data points within a particular geographic search area.

For example, 2D data 330 may be used to generate a spatial index of geographic or geospatial data covering all areas of the spherical surface. Such a spatial index may be stored as, for example, using a database or other collection. For example, such a spatial index may be represented using a quad tree data structure, as described above. The benefits and performance advantage of conducting searches for geographic data points represented using 2D data 330 in one or more quad tree data structures would be apparent to a person skilled in the relevant art given this description.

A. Searching Points Within a Bounded Geographic Search Area

In an embodiment, 2D data 330 may be used to perform a search for a specific geographic data point associated with the spherical surface using the first and second sets of Cartesian coordinates within the two-dimensional Cartesian space. For example, geographic data points may be searched within a quad tree data structure corresponding to 2D data 330. In an embodiment, a bounding box is initially received by boundary generator 340 that corresponds to a particular latitude/longitude space. A result for the search may consist of two parts: a list of data entries, and a list of object collections. Data entries represent single data points, while object collections represent clusters of objects.

Boundary generator 340 may determine a minimum output zoom level (or simply "minimum zoom level") in an index for the bounding box. For example, if an item can be placed or displayed without any overlaps or intersections at a given zoom level, it can also be displayed at greater zoom levels. Boundary generator 340 may use a zoom level to determine which objects or features should be output for the level. For example, for a grid node containing fewer than N items (where N is a predetermined value associated with a maximum number of items to output at the minimum zoom level), boundary generator 340 may search descendant or child nodes corresponding to the minimum zoom level for this node and traverse them. There may be no more than N such nodes. For a grid node which contains more than N items, the object collection for the node may be output for a minimum output zoom level or additional child nodes may be traversed as necessary until the minimum level is reached. For a leaf node, boundary generator 340 may iterate the list of data entries and append those which fall into the query bounding box to the output.

Further, when the nodes are completed, the data entries in the result may be scored (based, e.g., on popularity, last modification, or other user controlled parameters), and the most relevant ones may be output to limit the size of the output. It is noted that a query run at a sufficiently high zoom level may cause only data points corresponding to such a level to be emitted, e.g., if the level for a query bounding box reaches max level. For any query, a finite number of nodes may be explored, which is controlled by N and the number of levels one wants to reach.

It is noted that embodiments are described with respect to searching with quad trees for illustrative purposes and are not intended to be limited thereto. For example, embodiments can be used to search geographic data points using any efficient searching algorithm. Such efficient searching algorithms would be apparent to a person skilled in the art given this detailed description.

B. Density Correction

The projection of geographic data from a spherical surface such as, for example, the Earth, onto a three-dimensional polyhedron shape such as, for example, a cube, may cause density errors. For example, the same geographic (also spherical) distance when projected at the corner and center of a face within the two-dimensional Cartesian space will represent a larger distance near the corner than it would near the center. In other words, a fixed distance near a corner of a face in the Cartesian space represents a smaller geographic or spherical distance than the same distance near the center of a face A search for points within a fixed-size bounding box, a bounding box of a fixed size at the center of a cube face will therefore cover a larger portion of the spherical surface (e.g., the Earth) than the same box used near a corner.

In an embodiment, boundary generator 340 employs density correction unit 350 to correct for this effect by adjusting the size of the bounded geographic search area, i.e., the search box. If the box is increased in size near the cube corners, and reduced near the center of the faces, any visible defects or distortions can be removed. Further, by reducing or removing such density errors, the relative distances among the geographic data points within the bounded geographic search area remain consistent between the spherical surface and the two-dimensional Cartesian space. It is noted that such distances between points measured in the two-dimensional Cartesian space may vary relative to the distances between corresponding geographic points measured on the spherical surface depending on the shape of the polyhedron that is used. For example, for a projection involving a cube, distances between each may vary by a factor of two. However, such variation may be reduced by using different polyhedron shapes having a larger number of faces. Thus, using a polyhedron with a larger number of faces would result in smaller density errors.

It would be apparent to a person skilled in the art given this description that any number of well-known methods may be utilized by density correction unit 350 to determine the correct size of a bounded geographic search area so as to correct for density errors. In an example, density correction unit 350 may calculate the correct size of a geographical search area (i.e., adjusts the size of a search or bounding box) using trigonometry. In another example, density correction unit 350 may utilize a matrix of ratios covering a quarter of a face of the three-dimensional polyhedron (e.g., a quarter of a cube face) and then use a two-dimensional linear interpolation to calculate the correct adjustment for any given geographic location. An advantage of the latter approach may be speed and simplicity. For example, for cube projection, it has been found that a matrix of 20×20 points covering a quarter of a cube face is adequate.

IV. Example Cube Cutout Projection

The example cube cutout projection described in this section and in FIGS. 4 and 5A-5C is presented for illustrative purposes and embodiments are not limited to cubes or cube cutout shapes, as noted above. This example is also described with respect to the Earth for illustrative purposes only and embodiments are not limited thereto, as further noted above. Further, for ease of explanation, FIGS. 4 and 5A-5C may be described with respect to system 300 of FIG. 3, described above, but embodiments are not intended to be limited thereto.

Figure 4:
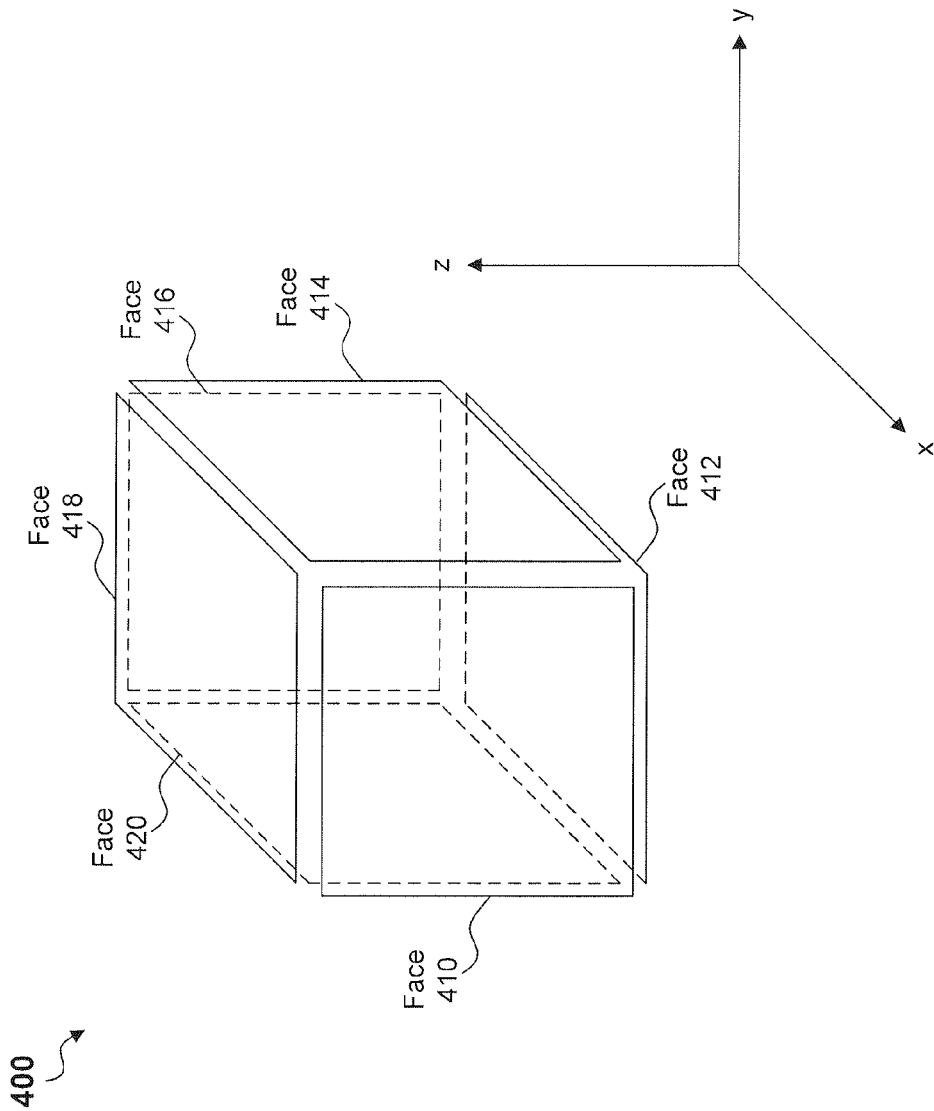
FIG. 4 is a diagram of an exemplary virtual cube for projecting geographic data from a spherical surface, according to an embodiment.

FIG. 4 is a diagram of an exemplary virtual three-dimensional cube 400 for projecting geographic data from a spherical surface, according to an embodiment. Cube 400 includes faces 410, 412, 414, 416, 418, and 420. For example, geographic Earth data may be projected (e.g., by data projector 310 of FIG. 3, described above) onto the six faces (i.e., faces 410, 412, 414, 416, 418, and 420) of cube 400. As described above, these cube faces may then be further projected or arranged in a pattern or shape on a two-dimensional Cartesian space such that faces which abut on the cube also abut (as far as possible) on the Cartesian space. The arranging or projecting is done in the same way one would draw out a flat paper shape which can be folded into a cube. Alternatively, the geographic data may be directly projected onto the cube cutout shape within the two-dimensional Cartesian space, as noted above.

Figure 5A:
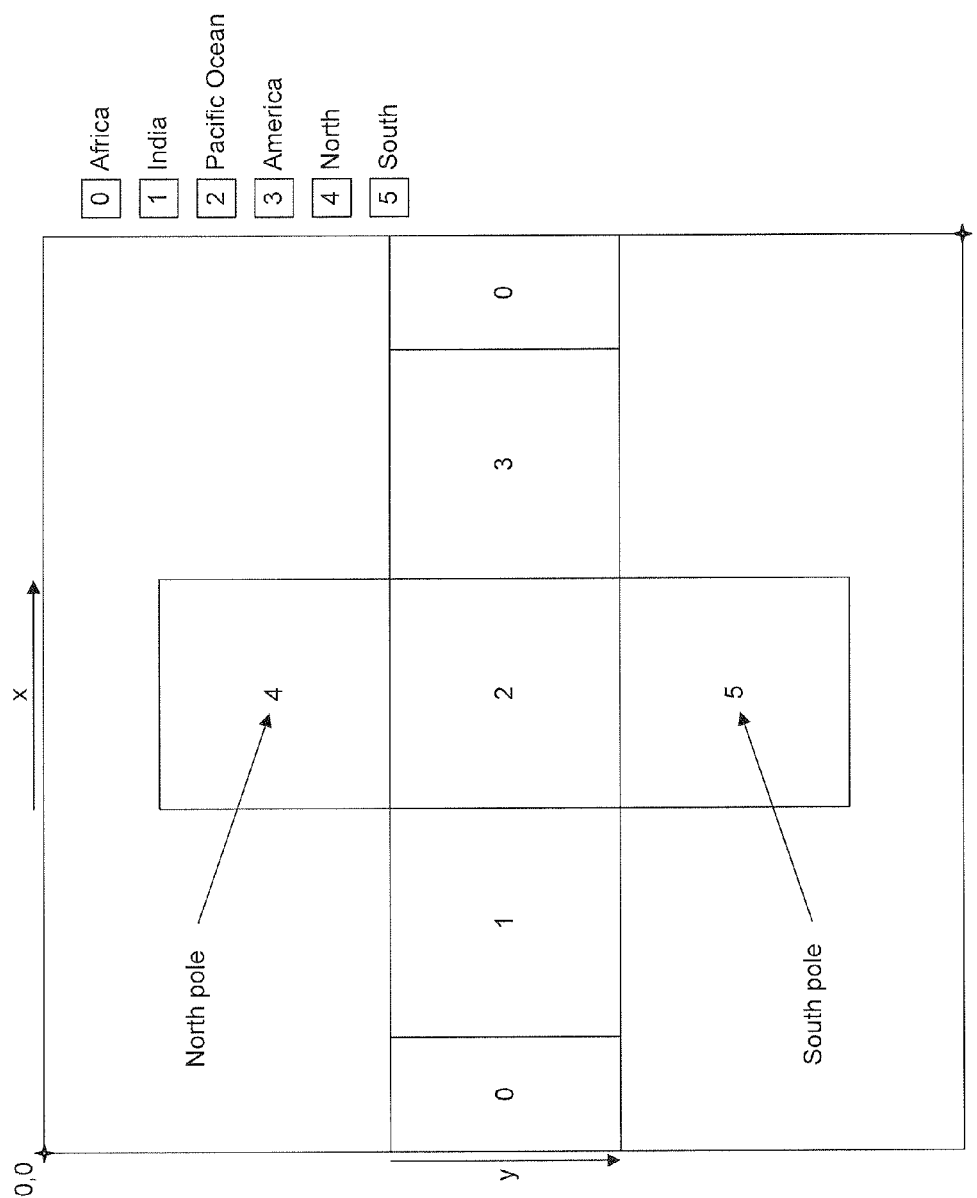
FIG. 5A illustrates an exemplary cube cutout shape for projecting geographic data from a spherical surface to a two-dimensional Cartesian space, according to an embodiment.

For example, FIG. 5A illustrates an exemplary cube cutout shape, according to an embodiment. The example cube cutout shape shown in FIG. 5A includes faces labeled 0-5, in which each face corresponds to a different geographic region of the Earth. For example, face 0 corresponds to Africa, face 1 to India, and so forth. In an example with respect to cube 400 of FIG. 4, the faces of the cube cutout shown in FIG. 5A may be thought of as the arranged faces of cube 400. Thus, for example, face 418 of cube 400 may be designated as the North pole and face 412 may be designated as the South pole. Thus, face 0 of FIG. 5A may correspond to face 416 of cube 400, face 1 to face 420, face 2 to face 410, face 3 to face 414, face 4 to face 418 and face 5 to face 412.

Figure 5B:
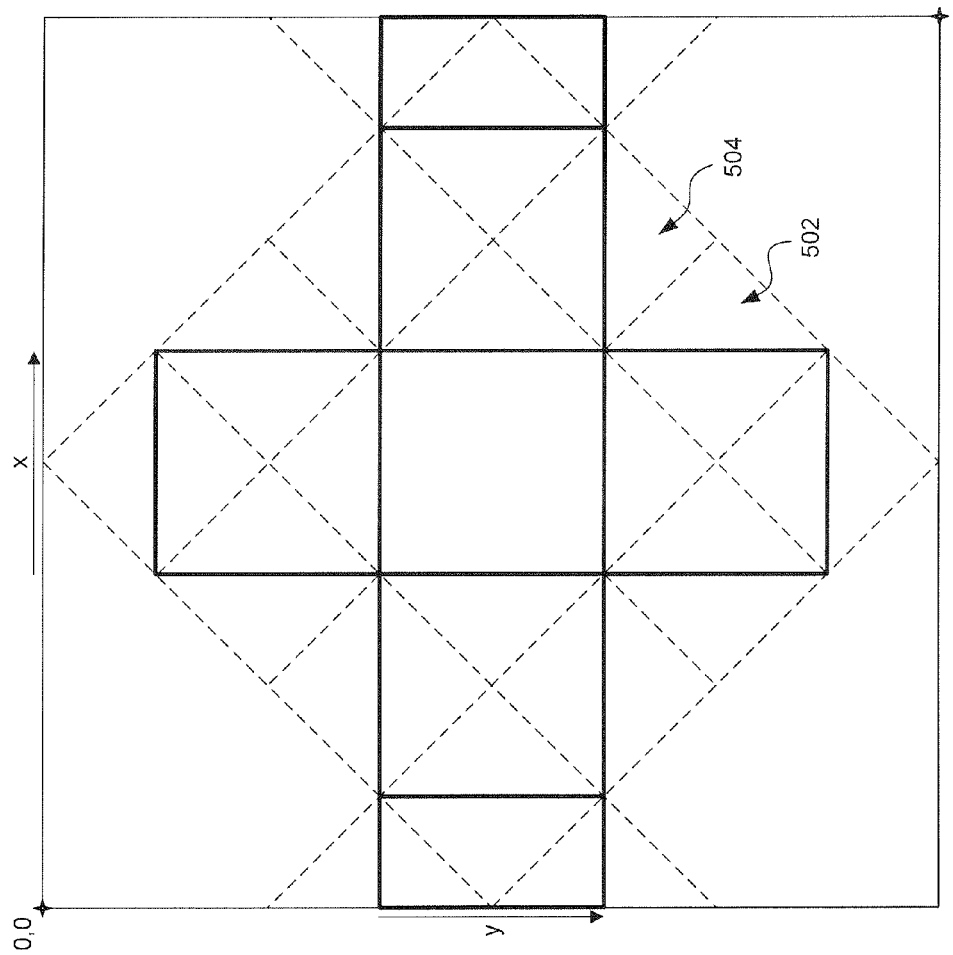
FIG. 5B illustrates an exemplary mapping of sections or tabs from faces of the cube cutout shape to locations within the two-dimensional Cartesian space, according to an embodiment.
Figure 5C:
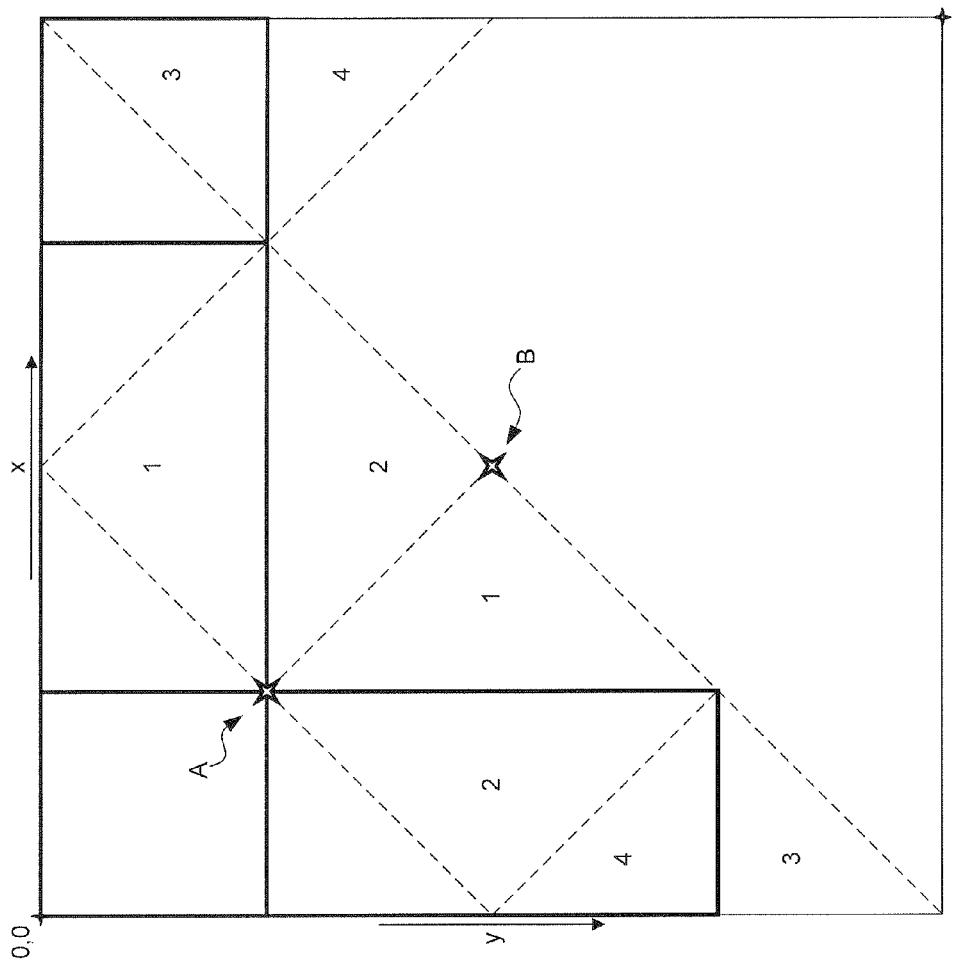
FIG. 5C illustrates an exemplary mapping of sections or tabs within a single quadrant of the two-dimensional Cartesian space, according to an embodiment.

It is noted that the designations of geographic regions to faces as illustrated in FIG. 5A are for provided illustrative purposes only and embodiments are not limited thereto. It is also noted that there are a number of ways to draw out such a foldable shape. The particular cube cutout shape shown in FIGS. 5A-5C is used for ease of explanation, and embodiments are not intended to be limited thereto.

In the example cube cutout shape shown in FIG. 5A, for any three faces which abut each other on a cube (e.g., cube 400 of FIG. 4, described above) thereby forming a corner, at most two of these joins can be directly represented on the cube cutout shape. In an example, for faces 1, 2 and 4, only 2 of the 3 joins are represented in the two-dimensional Cartesian space. In another example, for faces 0, 1 and 4, only the join between 0 and 1 is represented in the Cartesian space. Therefore, the other two joins that are not represented must be represented using mapped tabs, as described above. For any corner of the cube, there will be either one or two of the three joins which are present in Cartesian space. Thus, for any two faces which abut on the three-dimensional cube but not in the two-dimensional cutout shape, a simple search in the projected two-dimensional Cartesian space around a point at the edge of one face will not find collisions with the other face. This is because the other face may be arranged quite some distance away from the first face within the two-dimensional Cartesian space.

To solve the problem, tabs or sections of the faces from the cube cutout shape are mapped to various locations within the two-dimensional Cartesian space. By analogy, such tabs are similar to paper tabs one would add to a paper cube cutout in order to be able to glue abutting faces together. However, it is noted that while in the paper cutout example, one needs only a single tab per join, whereas in the example described herein, two tabs are used.

In this example, any given tab may correspond to a triangle forming a quarter of the area of one cube face. By further analogy to the paper cutout, it is precisely this triangle which the tab would overlap were the paper shape to be folded together. Thus, when inserting or projecting a geographic data point into the two-dimensional Cartesian coordinate space, it must be determined (e.g., by tap mapping unit 320 of FIG. 3, described above) whether the point lies on a part of a face whose area is also represented on a tab. If it is determined that the point does lie on a part of the face represented by a tab, we add the point also to the corresponding location on the tab itself. As noted above, geographic points may be added in either one or two places within the Cartesian coordinate space (for any given point on a cube face, there can be only one tab to which that point must be mapped).

In an alternative embodiment, the searching code itself may be adjusted such that if a search box overlaps the edge of a cube face, it is cut into pieces, and some of those pieces rotated and translated. Such an embodiment may be more complicated to implement than adding points multiple times within the two-dimensional Cartesian space. However, it should be noted that such an embodiment may yield lower memory use, as only one set of Cartesian coordinates rather than multiple sets is tracked for each geographic data point. Thus, such an approach may be desirable if, for example, the amount of available RAM becomes limited.

In yet another embodiment, the searching code may be adjusted such that if the center of a search box lies within an area of a face corresponding to a tab, a second search box is generated. Such a second search box may have the same dimensions as the original search box but have a center corresponding to the location of the mapped tab within the Cartesian space. A search for a projected data point corresponding to the tab can then be performed using both the original search box and the second search box. As multiple searches are performed, such an embodiment may require more processing time than a single search where some points have been added multiple times to the two-dimensional Cartesian space. However, an advantage of such an embodiment is that it may yield lower memory use, as only one set (as opposed to multiple sets) of Cartesian coordinates is tracked for each geographic data point. Therefore, this approach may be used if it is desirable to reduce RAM usage at the cost of increased CPU usage.

It is noted that there may be instances when a search box must be split into two search boxes. For example, the bounds of a search box may extend outside the bounds of the Cartesian space (i.e., such that the minimum X value is less than 0, or the maximum greater than the maximum X value possible). Such a search box must be split into two search boxes. One search box may be placed flush against the left-most edge of the Cartesian space while the other search box is placed flush against the right edge. For example, a search box centered around the center of face 0 shown in FIG. 5A, described above, must be split in two so as to cover the relevant portions of face 0, which are located on opposite sides of the Cartesian space.

FIG. 5B illustrates an exemplary mapping of sections or tabs from faces of the cube cutout shape in FIG. 5A to locations within the two-dimensional Cartesian space, according to an embodiment. It is noted that at least one face (the face corresponding to face 0 in FIG. 5A) wraps around from the left to the right in order to give the cutout shape folding symmetry across the X midpoint and across the Y midpoint of the two-dimensional Cartesian space. It would be apparent to a person skilled in the art given this description that an advantage of such folding symmetry is that it greatly simplifies the mapping of coordinates to tab coordinates, as described above.

FIG. 5C illustrates an exemplary mapping of sections or tabs within a single quadrant of the two-dimensional Cartesian space, according to an embodiment. For example, by ensuring that the projected cube cutout shape is centered on the two-dimensional Cartesian coordinate space, tab mapping unit 320 of FIG. 3, described above, can take advantage of the X and Y folding symmetry. Thus, the first stage of tab mapping may be to determine which quadrant a point is in, record that, and then map the X and Y coordinates from that into the single quadrant.

In the example quadrant shown in FIG. 5C, there exist only four tabs (tabs 1-4) to be mapped. The tabs shown as 1 and 2 have 90 degree rotational symmetry about point A (in opposite directions), and tabs 3 and 4 have 180 degree rotation symmetry about point B. A person skilled in the relevant art given this description would appreciate that by simplifying the problem to this level, only rotations of multiples of 90 degrees may be necessary. Accordingly, the tabs may be mapped (e.g., by tap mapping unit 320, described above) to the appropriate locations within the two-dimensional Cartesian space without having to use trigonometric operations.

V. Method

Figure 6:
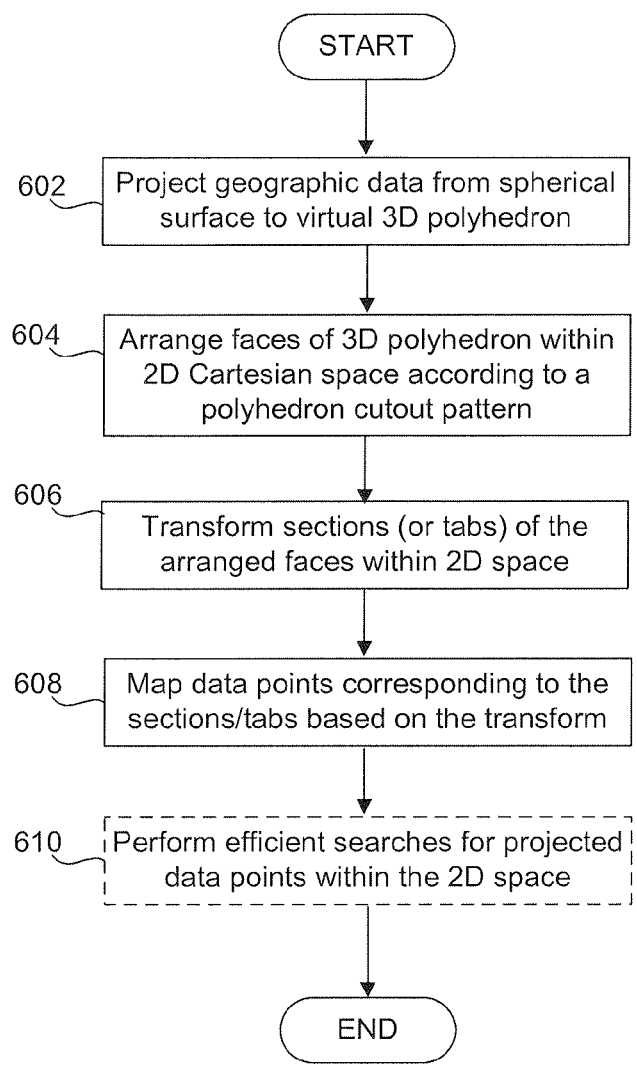
FIG. 6 is a flowchart of an exemplary method for projecting geographic data from a spherical surface to a two-dimensional Cartesian space, according to an embodiment.

FIG. 6 is a flowchart of an exemplary method 600 for projecting geographic data from a spherical surface to a two-dimensional Cartesian space, according to an embodiment. Method 600 includes steps 602, 604, 606, 608, and 610. For ease of explanation, system 300 of FIG. 3, as described above, will be used to describe method 600, but is not intended to be limited thereto. Method 600 begins in step 602, which includes projecting geographic data from a spherical surface onto faces of a three-dimensional polyhedron. As described above, the spherical surface may be any real-world spherical body that can be represented using a spherical model (e.g., the Earth, Moon, Mars, etc.). Further, as described above, the three-dimensional polyhedron includes, but is not limited to, a virtual three-dimensional cube. Step 602 may be performed by, for example, data projector 310 of FIG. 3, as described above.

Method 600 then proceeds to step 604, which includes arranging the faces of the three-dimensional polyhedron within a two-dimensional Cartesian space according to a cutout pattern corresponding to the type of polyhedron being used. For example, for a three-dimensional cube, the cutout pattern would be a cube cutout pattern, as described above. Such a cutout pattern or shape has folding symmetry across each dimension in the two-dimensional Cartesian space. Further, the geographic data points associated with the spherical surface are also mapped to Cartesian coordinates within the two-dimensional Cartesian space. It is noted that steps 602 and 604 may be collapsed, according to an embodiment. For example, the geographic data from the spherical surface may be projected directly onto a cutout shape within the two-dimensional Cartesian space. Step 604 may be performed by, for example, data projector 310 of FIG. 3, as described above.

Once the geographic data has been projected onto the two-dimensional Cartesian space, method 600 proceeds to step 606, in which sections (also referred to as "tabs") of the arranged faces are transformed to various locations within the two-dimensional space. As described above, step 606 may involve rotating and transposing the tabs so that edges of faces which adjoin in three-dimensional space (i.e., if the cutout shape were folded into the three-dimensional polyhedron) also adjoin within the two-dimensional Cartesian space. It is noted that ensuring that the cutout shape is centered within the two-dimensional Cartesian space, the folding symmetry of the cube cutout shape can be utilized to facilitate applying various transformations to the tab/sections. Further, as described above, such rotations may be kept to multiples of 90 degrees, thereby reducing the complexity of any operations that are performed.

After the tabs have been transformed in step 606, method 600 proceeds to step 608, in which projected geographic data points corresponding to the tabs are mapped to a second set of Cartesian coordinates corresponding to the locations of the transformed tabs within the two-dimensional Cartesian space. Thus, any projected geographic data point may be associated with either one or two sets of Cartesian coordinates. For example, a geographic data point that lies within a tab of a face would be associated with the Cartesian coordinates corresponding to the face and the Cartesian coordinates corresponding to the locations to which the tab has been transformed within the Cartesian space (e.g., as illustrated in FIG. 5C, as described above). Step 608 ensures that distances between geographic data points measured on the spherical surface are consistent with the same distances measured in the two-dimensional Cartesian space. Steps 606 and 608 may be performed by, for example, tab mapping unit 320 of FIG. 3, as described above.

Method 600 may then conclude after step 608 or in optional step 610, which includes performing efficient searches for projected data points within the two-dimensional Cartesian space. Such projected data points may represent geographic data points associated with the spherical surface, which lie within a bounded geographic area, as described above. Although not shown in method 600, as illustrated in FIG. 6, step 610 may include additional steps for correcting density errors related to distances between points as reflected within the two-dimensional Cartesian space. As described above, such density errors may result as a consequence of projecting geographic data points from a spherical surface such as, for example, the Earth, onto the faces of a three-dimensional polyhedron shape. Step 610 may be performed by, for example, boundary generator 340 and density correction unit 350 of FIG. 3, as described above.

One advantage of embodiments of method 600 as described herein is that such embodiments provide a relatively simple and fast translation from latitude/longitude coordinates from a spherical surface to a two-dimensional Cartesian space, while maintaining a small variation in the physical size of a pixel (steps 602-608). Further, embodiments enable searching spherical geographic data using a two-dimensional Cartesian space (step 610). Searching by utilizing such a translation of spherical geographic data to Cartesian coordinates, as described herein, can reduce complexity and increase computing performance relative to traditional solutions that generally require an area search over the three-dimensional spherical surface.

VI. Example Computer System Implementation

Aspects of the present invention shown in FIGS. 1-6, or any part(s) or function(s) thereof, may be implemented using hardware, software modules, firmware, tangible computer readable media having instructions stored thereon, or a combination thereof and may be implemented in one or more computer systems or other processing systems.

Figure 7:
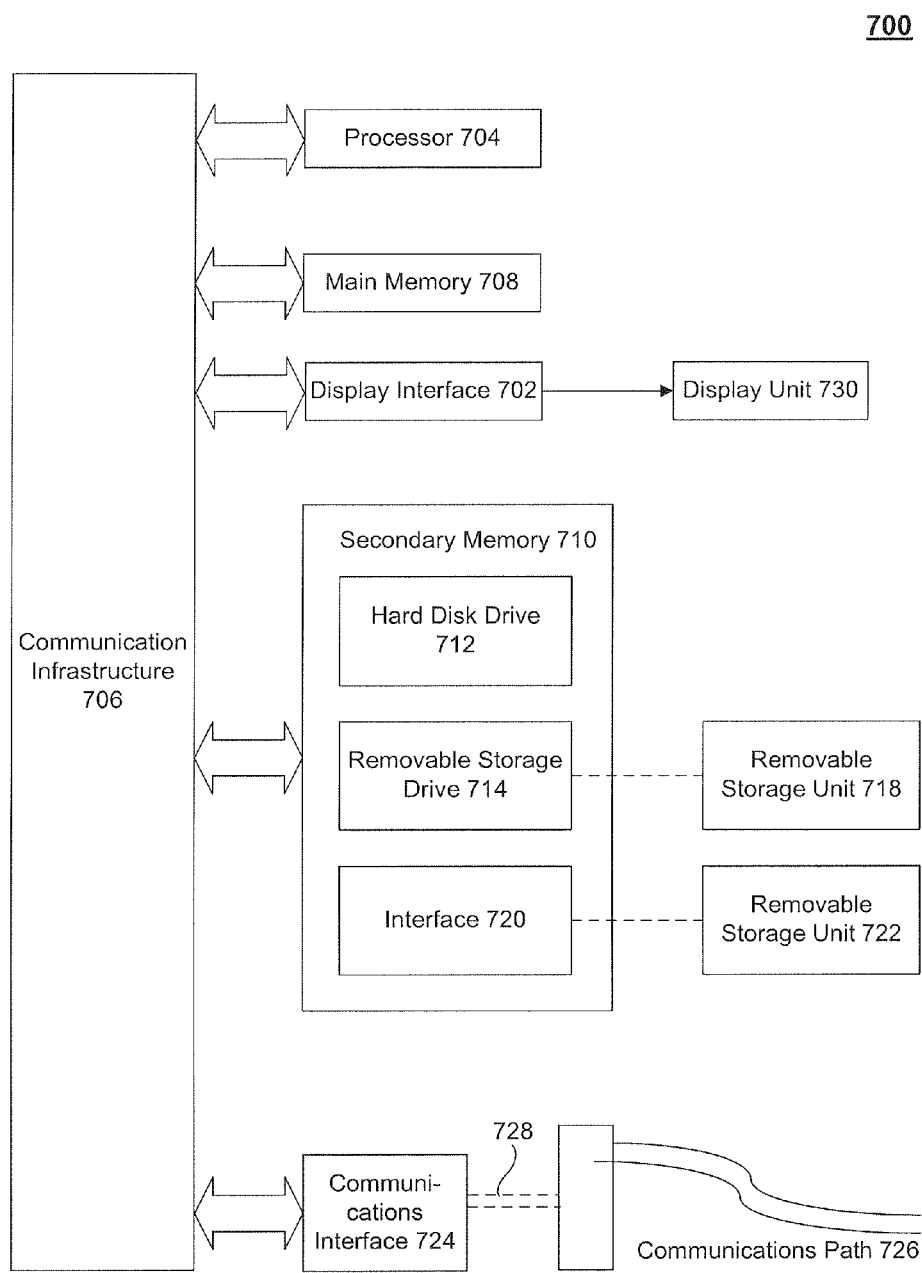
FIG. 7 is a diagram of an example computer system in which embodiments can be implemented.

FIG. 7 illustrates an example computer system 700 in which embodiments of the present invention, or portions thereof, may by implemented as computer-readable code. For example, one or more components of system 100 of FIG. 1, system 200 of FIG. 2, and/or system 300 of FIG. 3, can be implemented in computer system 700 using hardware, software, firmware, tangible computer readable media having instructions stored thereon, or a combination thereof and may be implemented in one or more computer systems or other processing systems. Hardware, software, or any combination of such may embody one or more of the modules and components in FIGS. 1-6.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, etc. which is read by and written to by removable storage drive 714. As will be appreciated by persons skilled in the relevant art, removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communications interface 724. Such computer programs, when executed, enable computer system 700 to implement embodiments of the present invention as discussed herein. In particular, the computer programs, when executed, enable processor device 704 to implement the processes of embodiments, such as the stages in the method illustrated by flowchart 600 of FIG. 6 discussed above. Accordingly, such computer programs represent controllers of the computer system 700. Where embodiments are implemented using software, the software may be stored in a computer program product and loaded into computer system 700 using removable storage drive 714, interface 720, and hard disk drive 712, or communications interface 724.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

VII. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for projecting geographic data from a spherical surface to a two-dimensional Cartesian space, comprising:
   projecting the geographic data from the spherical surface onto faces of a three-dimensional polyhedron;
   arranging the faces of the three-dimensional polyhedron within the two-dimensional Cartesian space according to a cutout pattern corresponding to a shape of the three-dimensional polyhedron, wherein geographic data points associated with the spherical surface are mapped to a first set of Cartesian coordinates associated with the arranged faces within two-dimensional Cartesian space; and
   mapping one or more data points in the geographic data points to a second set of Cartesian coordinates outside of the cutout pattern and within the two-dimensional Cartesian space based on the arranging so that relative distances among the geographic data points remain consistent between the spherical surface and the two-dimensional Cartesian space.

2. The method of claim 1, wherein at least one face in the arranged faces has folding symmetry across each dimension of the two-dimensional Cartesian space.

3. The method of claim 1, wherein the three-dimensional polyhedron is a cube and the cutout pattern is a cube cutout pattern.

4. The method of claim 1, further comprising:
   performing a search for a specific geographic data point associated with the spherical surface using the first and second sets of Cartesian coordinates within the two-dimensional Cartesian space.

5. The method of claim 4, wherein the specific geographic data point is within a bounded geographic search area including a first area within the cutout pattern and a second area outside the cutout pattern.

6. The method of claim 5, wherein the performing further comprises:
   adjusting a size of the bounded geographic search area in order to minimize density errors associated with the corner of the face so that the relative distances among the geographic data points within the bounded geographic search area remain consistent between the spherical surface and the two-dimensional Cartesian space.

7. The method of claim 1, wherein the mapping comprises:
   identifying a first face and a second face in the arranged faces based on the cutout pattern, wherein a first edge of the first face adjoins a second edge of the second face on the three-dimensional polyhedron but not within the two-dimensional Cartesian space;
   transforming a first section of the identified first face to a first location in the two-dimensional Cartesian space;
   transforming a second section of the identified second face to a second location in the two-dimensional Cartesian space so that the first edge of the first face adjoins the second edge of the second face within the two-dimensional Cartesian space, wherein the second set of Cartesian coordinates is associated with the transformed first and second sections of the respective first and second faces within the two-dimensional Cartesian space; and
   mapping the one or more data points from the arranged faces to the second set of Cartesian coordinates associated with the transformed first and second sections of the respective first and second faces, wherein the one or more data points are mapped to the first set of Cartesian coordinates and the second set of Cartesian coordinates.

8. The method of claim 7, wherein the transforming further comprises:
   applying a first transformation to the first section of the first face based on a first face-dependent rotation associated with the first face; and
   applying a second transformation to the second section of the second face based on a second face-dependent rotation associated with the second face.

9. The method of claim 8, wherein the applying the first and second transformations comprises:
   determining a quadrant of the two-dimensional Cartesian space for each data point in the one or more data points corresponding to the first and second sections of the respective first and second faces; and
   rotating and transposing the first and second sections within the determined quadrant based on the respective first and second face-dependent rotations associated with the respective first and second faces.

10. The method of claim 9, wherein the first and second face-dependent rotations are determined based on the projected geographic data associated with each of the respective first and second faces.

11. The method of claim 10, wherein the first and second face-dependent rotations are each multiples of 90 degrees.

12. The method of claim 11, wherein the first face-dependent rotation is 90 degrees in a first direction and the second face-dependent rotation is 90 degrees in a second direction opposite to the first direction.

13. The method of claim 11, wherein the first face-dependent rotation is 180 degrees in a first direction and the second face-dependent rotation is 180 degrees in a second direction opposite to the first direction.

14. The method of claim 1, wherein several of the geographic data points mapped to the first set of Cartesian coordinates are not mapped to the second set of Cartesian coordinates outside of the cutout pattern.

15. A computer-implemented method to transform geographic data from a spherical surface to Cartesian space, comprising:
projecting geographic coordinates associated with the spherical surface onto a cube cutout shape centered on the two-dimensional Cartesian space, the cube cutout shape comprising a plurality of faces that form a virtual cube when folded, wherein the cube cutout shape has folding symmetry across each dimension in the two-dimensional Cartesian space, and wherein the geographic coordinates associated with the spherical surface are mapped to a first set of Cartesian coordinates associated with the cube cutout shape;
transforming sections of faces in the plurality of faces from the cube cutout shape to locations within the two-dimensional Cartesian space so that sides of the faces that adjoin on the virtual cube also adjoin within the two-dimensional Cartesian space; and
mapping geographic data points associated with the sections of faces in the plurality of faces to a second set of Cartesian coordinates outside of the cube cutout shape and within the two-dimensional Cartesian space based on the transforming, wherein the geographic data points associated with the transformed sections are mapped to the first and second sets of Cartesian coordinates, and relative distances among the geographic data points remain consistent between the spherical surface and the two-dimensional Cartesian space.

16. A system for projecting geographic data from a spherical surface to a two-dimensional Cartesian space, comprising:
data projector to project the geographic data from the spherical surface onto faces of a three-dimensional polyhedron, to arrange the faces of the three-dimensional polyhedron within the two-dimensional Cartesian space according to a cutout pattern corresponding to a shape of the three-dimensional polyhedron, wherein geographic data points associated with the spherical surface are mapped to a first set of Cartesian coordinates associated with the arranged faces within two-dimensional Cartesian space; and
a tab mapping unit to map one or more data points in the geographic data points to a second set of Cartesian coordinates outside of the cutout pattern and within the two-dimensional Cartesian space based on the arranging so that relative distances among the geographic data points remain consistent between the spherical surface and the two-dimensional Cartesian space.

17. The system of claim 16, wherein at least one face in the arranged faces has folding symmetry across each dimension of the two-dimensional Cartesian space.

18. The system of claim 16, wherein the three-dimensional polyhedron is a cube and the cutout pattern is a cube cutout pattern.

19. The system of claim 16, further comprising:
a boundary generator to perform a search for a specific geographic data point associated with the spherical surface using the first and second sets of Cartesian coordinates within the two-dimensional Cartesian space.

20. The system of claim 19, wherein the specific geographic data point is within a bounded geographic search area including a first area within the cutout pattern and a second area outside the cutout pattern.

21. The system of claim 20, further comprising:
a density correction unit to adjust a size of the bounded geographic search area in order to minimize density errors associated with the corner of the face so that the relative distances among the geographic data points within the bounded geographic search area remain consistent between the spherical surface and the two-dimensional Cartesian space.

22. The system of claim 16, wherein the tab mapping unit is configured to:
identify a first face and a second face in the arranged faces based on the cutout pattern, wherein a first edge of the first face adjoins a second edge of the second face on the three-dimensional polyhedron but not within the two-dimensional Cartesian space,
transform a first section of the identified first face to a first location in the two-dimensional Cartesian space,
transform a second section of the identified second face to a second location in the two-dimensional Cartesian space so that the first edge of the first face adjoins the second edge of the second face within the two-dimensional Cartesian space, wherein the second set of Cartesian coordinates is associated with the transformed first and second sections of the respective first and second faces within the two-dimensional Cartesian space, and
map the one or more data points from the arranged faces to the second set of Cartesian coordinates associated with the transformed first and second sections of the respective first and second faces, wherein the one or more data points are mapped to the first set of Cartesian coordinates and the second set of Cartesian coordinates.

23. The system of claim 22, wherein the tab mapping unit is further configured to:
apply a first transformation to the first section of the first face based on a first face-dependent rotation associated with the first face, and
apply a second transformation to the second section of the second face based on a second face-dependent rotation associated with the second face.

24. The system of claim 23, wherein the tab mapping unit is configured to:
determine a quadrant of the two-dimensional Cartesian space for each data point in the one or more data points corresponding to the first and second sections of the respective first and second faces, and
rotate and transpose the first and second sections within the determined quadrant based on the respective first and second face-dependent rotations associated with the respective first and second faces.

25. The system of claim 24, wherein the first and second face-dependent rotations are determined based on the projected geographic data associated with each of the respective first and second faces.

26. The system of claim 25, wherein the first and second face-dependent rotations are each multiples of 90 degrees.

27. The system of claim 26, wherein the first face-dependent rotation is 90 degrees in a first direction and the second face-dependent rotation is 90 degrees in a second direction opposite to the first direction.

* * * * *